UNITED STATES PATENT OFFICE.

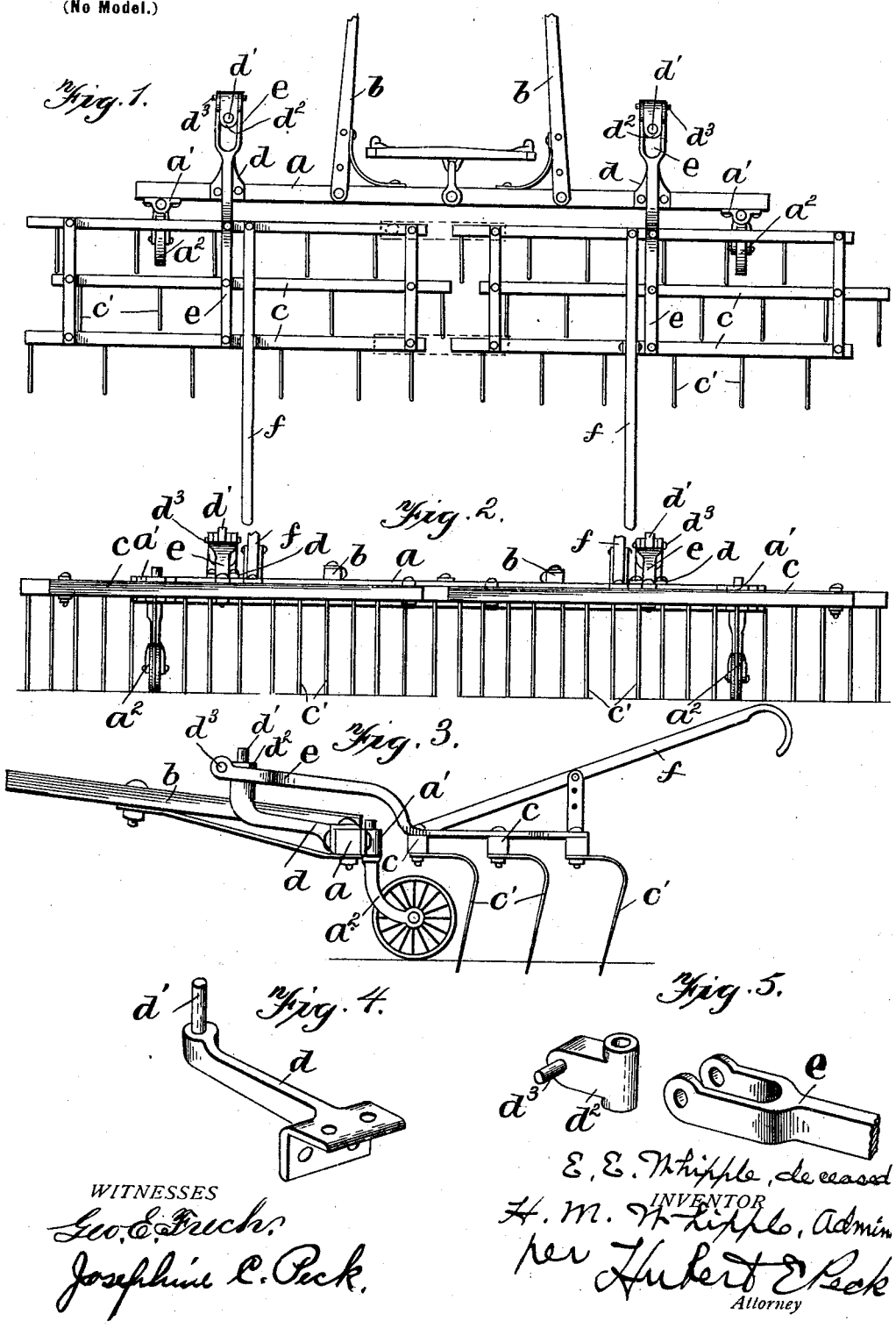

HANNAH M. WHIPPLE, OF DETROIT, MICHIGAN, ADMINISTRATRIX OF EFFINGER E. WHIPPLE, DECEASED.

WEEDER.

SPECIFICATION forming part of Letters Patent No. 637,191, dated November 14, 1899.

Application filed March 1, 1899. Serial No. 707,342. (No model.)

*To all whom it may concern:*

Be it known that EFFINGER E. WHIPPLE, deceased, late a citizen of the United States, residing at St. Johns, in the county of Wayne and State of Michigan, invented certain new and useful Improvements in Weeders; and I, HANNAH M. WHIPPLE, administratrix, do hereby declare the following to be a full, clear, and exact description of the invention, such as will enable others skilled in the art to which it appertains to make and use the same.

This invention relates to certain improvements in agricultural implements, and more particularly to weeders, cultivators, or the like; and the objects and nature of the invention will be apparent to those skilled in the art in the light of the accompanying drawings, showing one construction out of many within the scope of this invention as an example.

The invention consists in certain novel features in construction and in combinations and in arrangements of parts and details, as more fully and particularly pointed out and described hereinafter.

In the drawings, Figure 1 is a top plan view. Fig. 2 is a rear view. Fig. 3 is a side elevation. Figs. 4 and 5 are detail views, as more fully brought out hereinafter.

In the drawings, $a$ is a transversely-arranged supporting frame, bar, or axle having suitable forwardly-extending draft and guiding connections rigid therewith. Thills or shafts $b$ to receive a single horse or other draft-animal can be employed, as shown in Fig. 1, or a single forwardly-extending tongue $b'$ can be employed, as shown in Fig. 3. In either case the draft and guiding device is preferably rigid with the axle $a$, and the draft connections are so arranged as to apply the draft about centrally to said axle.

The axle near its ends is provided with suitable wheeled supports. However, the invention is not limited to the employment of wheeled supports for the axle.

In the specific construction shown vertical sockets $a'$ are shown rigid with the rear edge of the axle, and caster-wheeled frames $a^2$ have their shanks fitted in said sockets, so that the sockets rest on the frames which hold the axle in the desired horizontal plane. The said wheeled frames preferably extend downwardly and rearwardly from the axle and at their lower rear ends are provided with the small supporting-wheels. These wheeled frames are preferably loose to turn independently of the axle, but, if so desired, can be rigid therewith.

$c$ is the wide transversely-arranged tooth-gang in rear of the axle and composed of several parallel tooth-bars carrying teeth $c'$. The tooth-gang is usually wider than the axle is long, so as to cover a wide swath in action. It is preferable to form this tooth gang or frame in independent sections transversely of the gang. Each gang has a separate pivotal connection with the wheeled support. The point of loose connection or the point of pivotal connection between each section and the wheeled support is preferably arranged at a point in advance of the axle of the wheeled support. This coupling is preferably effected by means of arms or brackets $d$, rigid with the axle and extending forwardly thereof. At the desired point in advance of the axle each arm or bracket has a vertical portion, terminating in spindle $d'$. A turn-block $d^2$ is mounted on a spindle. The forward end of this block has the opposite lateral pintles $d^3$, extending horizontally from the opposite edges thereof. These forwardly-extending rigid arms or brackets are arranged opposite the central portions of the gang-sections, respectively. Each gang-section has a bar $e$ rigidly secured across the tooth-beams thereof at about the central portion of the length of the section. Each bar $e$ is extended forwardly of this section and deflected upwardly over the axle and rigid arm and has its front end bifurcated or forked and fitting on opposite sides of block $d^2$ and fulcrumed on the pivots $d^3$. The rear end of each arm or bracket $d$ can be forked to fit the front and top edge of the axle and be rigidly bolted thereto. Each section can have a rearwardly-extending handle $f$, so that the operator walking in rear of the implement can raise or lower or move the gang-sections laterally independently of each other and of the wheeled support.

If desired, the gang-sections can be coupled together at their inner ends by removable plates, as shown by dotted lines in Fig. 1.

It will be observed that each gang-section swings vertically from the pintles $d^3$ as a center and swings laterally on the spindle $d'$ as a center. It will be observed that these centers of vertical and horizontal swing are arranged a considerable distance in advance of the tooth-carrying frame proper, so that each gang-section has a comparatively long centrally-disposed reach or draft bar or connection, whereby the working depth of the teeth can be varied and yet the tooth-frame maintained approximately level. If desired, the gang-sections can be raised and swung laterally, so that portions of the front tooth-beams thereof rest on the top of the axle, thereby holding the gang-sections in elevated positions on the axle, with their teeth raised from the ground. The device can be adapted for transportation in this way, with the weight of the gang-sections thrown onto the wheel. However, lifting and supporting devices for the gang-sections can be provided and also spring devices to aid the operator in lifting the gang-sections; but as such additions form no part of this present invention, they are not shown in the drawings. It is also obvious that for the purposes of transportation the gang-sections can be elevated and blocks interposed between the wheeled axle and bars $e$ to hold the gang-sections in the elevated position.

It is obvious that various changes and modifications might be resorted to in the forms, constructions, and combinations disclosed herein without departing from the spirit and scope of this invention. Hence it is not desired to limit this case to the construction set forth.

Having thus fully described the invention, what is claimed as new, and desired to be secured by Letters Patent of the United States, is—

1. A weeder having a wheeled axle with a rigid forwardly-extending draft connection, a wide transversely-arranged tooth-gang in rear of the axle and provided with forwardly-extending reach-bars extending over the axle and coupled loosely thereto at points in advance thereof, substantially as described.

2. In combination, a wheeled axle, forwardly-extending brackets rigid therewith, turn-blocks loose on said brackets, the gang-sections having rigid forwardly-extending reach-bars at the front ends pivotally joined to said blocks respectively, substantially as described.

3. A wheeled support having forwardly-extending draft devices rigid therewith and depending caster-wheel ground-supports, in combination with transversely-arranged tooth-gang sections arranged in rear of said support, each tooth-gang section having a long reach-bar connection above the plane of the wheeled support with an advanced portion of said wheeled support, substantially as described.

4. A wheeled support having draft devices and provided with rigid forwardly-extending portions, in combination with tooth-gang sections in rear of said wheeled support provided with reach-bar connections, respectively, above and coupled with said forwardly-extending portions, substantially as described.

5. A cross-frame having ground-supports and forwardly-extending portions near its opposite ends, in combination with tooth-gang sections having long reach-bar connections above said cross-frame and with said portions, respectively, substantially as described.

6. A cross-bar, to which the draft is applied, having ground supports, in combination with a tooth-gang in rear of said bar and formed of independent sections, each section at a central point provided with a reach-bar rigid therewith and extending forwardly over said cross-bar and at its front portion coupled loosely with said cross-bar at a point in advance thereof, substantially as described.

7. A support, to which the draft is applied, having ground-supports and provided with a forwardly-extending bracket, in combination with a tooth-gang having a reach-bar rigid therewith and extending forwardly over and coupled at its forward portion with the forward portion of said bracket, substantially as described.

In testimony whereof I affix my signature in presence of two witnesses.

HANNAH M. WHIPPLE,
*Administratrix of said Effinger E. Whipple, deceased.*

Witnesses:
MARY MAUD WHIPPLE,
F. O. WHIPPLE.